Patented Aug. 24, 1948

2,447,621

UNITED STATES PATENT OFFICE 2,447,621

UREA-FORMALDEHYDE MOLDING COMPOSITION

Leonard Smidth, New York, N. Y.

No Drawing. Application September 4, 1943,
Serial No. 501,290

4 Claims. (Cl. 260—17.3)

This invention relates in general to fusible urea-formaldehyde compositions and to a process for preparing such compositions and the compositions so produced, and includes correlated improvements designed to enhance the stability, flow characteristics and properties of the resulting products.

This application is a continuation-in-part of my co-pending applications Serial Nos. 664,207 now Patent No. 2,329,172, and 664,208, now abandoned, both filed April 3, 1933.

Fusible urea-formaldehyde condensates, for example, as used in compression molding, must have a number of correlated properties in order to be commercially successful. In the first place, such compositions must be stable during storage and prior to the application of elevated temperatures and pressure. Heretofore, such compositions have been characterized by a slow conversion from the fusible to the infusible state on standing. Such instability has been due in part to the presence in the composition of free or potential water which tends to promote hydrolysis of any latent catalyst present and cause a premature curing of the composition. Secondly, such compositions, particularly when used in laminating, must flow uniformly, otherwise the product will not be uniform in properties or appearance. Thus the compositions heretofore prepared have been characterized by not being uniform in their flow characteristics under heat and pressure, or by flowing insufficiently under the heat and pressure employed so that high pressures and/or temperatures were frequently necessary to produce the desired flow. Finally, molded products which may be formed from such compositions should be characterized by freedom from brittleness. With compositions heretofore used, the molded products have been often too brittle; or an undesired brittleness has gradually developed in such prior products on ageing.

However, in my co-pending parent application Serial No. 664,207, I disclosed for the first time urea-formaldehyde compositions free from the above objections and characterized by good stability, increased flow and freedom from brittleness, the composition disclosed in said prior applications being a free-flowing molding powder comprising a powdered solid intermediate condensation product of a urea and formaldehyde containing a cellulose filler, the powder containing not more than 20% by weight of an absorbed liquid selected from the group consisting of (a) a solution of a urea and formaldehyde, and (b) a solution of a urea-formaldehyde reaction product, the sum of the absorbed urea and formaldehyde in the total mass being in a mole ratio of between 1.05 to 1.40 of urea to 2 of formaldehyde, the absorbed liquid imparting to the molding powder an increased plasticity in the mold under heat and pressure.

Among the various solutions of urea-formaldehyde reaction products disclosed in said prior applications was the non-aqueous organic solution of a reaction product of urea, formaldehyde and an alcohol. The use of such a solution has certain advantages over the other solutions disclosed therein as will be pointed out hereinafter.

Therefore, it is a general object of the present invention to provide fusible urea-formaldehyde compositions which are free from the objections above mentioned, and which are characterized by being stable, by having improved flow characteristics under heat and pressure, and from which there may be produced products which are not objectionally brittle, and which do not become embrittled upon ageing.

It is a specific object of the invention to provide a molding composition comprising a fusible urea-formaldehyde condensate, which composition will be stable for long periods of time during storage and up to the time of the application of heat and pressure, despite the fact that the composition may contain a latent curing catalyst.

It is a further specific object of the invention to provide a urea-formaldehyde molding composition which is characterized by having an improved and uniform flow under the application of heat and pressure as employed in compression molding and laminating.

Another specific object is to provide a process for the production of urea-formaldehyde molding compositions having the improved characteristics above described.

Other objects of the invention will in part be obvious and will in part appear hereinafter.

In accordance with the present invention, there is provided a stable synthetic resin composition comprising a fusible urea-formaldehyde condensate combined with a minor proportion of a flow promoter comprising a fusible, organic solvent-soluble urea-formaldehyde-alcohol condensate, said composition containing a minimum of free or potential water, and being characterized by a high degree of stability during storage and increased flow when subjected to heat and pressure, but producing molded products which are free from brittleness. In general, the preparation of such a composition comprises mixing a fusible urea-formaldehyde condensate with a cellulose filler, a latent catalyst, and a minor proportion of a flow promoter comprising a non-aqueous fusible, urea-formaldehyde-alcohol condensate dissolved in a volatile organic solvent with or without non-volatile plasticizers, mold lubricants and the like, and evaporating the volatile organic solvent and water from said composition, the dried product being reduced to powder or granulated form by suitable means.

The invention, accordingly, comprises the several steps and relation of one or more of such steps with respect to each of the others, and the composition possessing the features, properties, and the relation of elements, which are exemplified in the following detailed disclosure, and the scope of the invention will be indicated in the claims.

In the preparation of the fusible urea-formaldehyde and also of the fusible urea-formaldehyde-alcohol condensate, there may be used instead of urea, thiourea or substitute products of urea or thiourea. The formaldehyde may be used in aqueous solution, or in the gaseous state, or in the form of an anhydrous solution of formaldehyde, or in the form of solid polymers of formaldehyde. Also, there may be used trioxane, which in the presence of acids and heat, hydrolyzes to yield formaldehyde.

The cellulose filler

In preparing urea-formaldehyde compositions of the class described for molding, casting and the like, an aqueous solution of a condensation product of a urea-formaldehyde is mixed or masticated with a filler. In this connection I have shown that the composition is particularly useful when combined with cellulosic fillers, for example, paper, cellulose, paper pulp, sawdust, linters, cotton, cloth and the like, in order to produce a materially improved finished product which will be non-inflammable and in which the water absorption will be at a minimum. Other fillers, supports and the like, such as asbestos, lithopone, china clay, or talc, may be introduced at any time during the process if so desired.

Preparation of the fusible urea-formaldehyde condensate

In the preparation of the fusible urea-formaldehyde condensate, the urea and formaldehyde are mixed and reaction carried out at a controlled temperature above or below 100° C., or by boiling, in acid media. The invention is not to be limited to any specific method of making the urea-formaldehyde condensate, but for purposes of illustration only, the following procedures may be used, based upon the procedure outlined in my Serial Nos. 664,208 and 429,202, filed Feb. 17, 1930, now abandoned.

I have shown in my earlier applications aforementioned that fusible condensates of good quality may be obtained by reacting urea and formaldehyde in a molar ratio of greater than 1.05 mols of urea per 2 mols of formaldehyde, and preferably in the ratio range of 1.05–1.40:2. The theoretical optimum ratio of combined formaldehyde and urea in the condensation product is 2:1.33, but in obtaining this ratio in accordance with the present preferred process, a somewhat larger proportion of formaldehyde is used for certain operational advantages and to allow for loss of formaldehyde during drying. Somewhat more than 1.40 mols of urea may be used if desired, but special procedures must be followed. For example, the additional urea may be gradually added in small proportions to the 2 mols of formaldehyde. A product satisfactory for many purposes can be obtained in such manner, even though the resulting mass may be clouded and the final product somewhat weakened by the excess urea. The invention is not limited to any exact procedure for mixing the given proportions of urea and formaldehyde, as it is obvious that different methods may be employed.

Commercial formaldehyde usually contains acidic material, mostly formic acid, in sufficient quantity to establish a concentration of hydrogen ions of a pH 3.0. In order to maintain the rate of reaction between urea and formaldehyde completely under control, the pH is preferably initially adjusted to between 4.0 and 7.5. The condensation reaction is thus preferably carried out under neutral or only slightly acidic conditions by adjusting the same to a pH value between 6 and 7, preferably 6.5.

The fusible condensate thus produced is then mixed with a cellulose filler and the resulting product is then mixed with the flow promoter comprising the urea-formaldehyde-alcohol condensate either before or after drying of the fusible urea-formaldehyde condensate. The condensate containing the cellulose filler and with or without the addition of the flow promoter is dried under such conditions that the advancement of the reaction and premature curing is avoided, the drying being carried out at an elevated temperature but not above 100° C., a temperature of from 50° C. to 90° C. being suitable.

During drying of the urea-formaldehyde condensate, the pH may lie between 4 and 7, but if the product is to be stored for any substantial period of time, the dried product should be nearly neutral, such as pH 6.5. If the pH is allowed to fall appreciably below 5.8 during the drying operation, the reaction advances and results in an inferior product for casting, molding and the like. Hence precautions should be taken to maintain the pH of the composition as near 6.5 as possible during the drying operation. This is preferably done by adding sufficient basic material to the composition prior to drying to compensate for any reduction in pH, or by blowing air through the composition during drying to remove excess volatile acids which may be present, such as formic acid. The basic material may be added initially, or at any stage prior to or during the drying operation.

If the composition is placed in storage for an appreciable time after drying, the pH should not be allowed to fall below 5.8, otherwise the material will stiffen on standing. Apparently a pH greater than 7 does not appreciably affect the stability of the composition, but if the pH is greater than 7, the composition will not cure as rapidly. Slight acidities of a pH value higher than 6 in the composition are preferred not only because of better control of the reaction and greater stability during storage, but also because such acidities do not advance the reaction to a point where stiffening interfered with the flow. This is true for compositions in which there is no flow stabilizer present. When using the flow stabilizer of my present invention however, somewhat greater acidities, i. e., lower pH values, for example 5.5 may be used without affecting the stability on storage thus providing for a greater flexibility in connection with acidity and storage stability. Thus, the higher acidity accelerates the rate of cure of composition during molding.

For reducing the acidity of the reaction product, there may be used a neutralizing agent selected from the class of inorganic alkalies and organic bases. For the inorganic alkalies, there may be used water-soluble alkalies such as sodium hydroxide, potassium hydroxide, lithium hydroxide, and ammonium hydroxide. For the organic bases, there may be employed any primary, secondary or tertiary amines, or a quaternary ammonium base, such, for example, as methyl amine, dimethyl amine, triethyl amine, monoethanolamine, diethanolamine, triethanolamine, tribenzyl methyl ammonium hydroxide and the like.

For the latent acid catalyst used to promote the curing, there may be employed any substance capable of developing, under the heat and pressure employed in molding, any substance which is acid in character, such, for example, as the substances described in my U. S. application Serial No. 429,202, in which there is described latent acid catalysts comprising ammonium salts, such as the salt formed by the use of ammonia as the neutralizing agent during reaction, and various inorganic salts, acid salts, water soluble esters, and organic compounds, for example, salts of chloracetic acid and other salts, as for example, zinc chloride; water-soluble esters, as, for example, methyl formate; and other organic compounds as for example, formamide; which substances upon heating yield free hydrogen ions. These substances themselves hydrolyze in solution or they react in some manner during subsequent heating operations, for example, hot molding, to yield free hydrogen ions, thus accelerating the curing or hardening of the urea-formaldehyde compositions.

There may also be advantageously added to the composition suitable mold lubricants to prevent adhesion of the plastic to the mold, such, for example, as metallic soaps, such, for example, as the oleates, stearates and palmates of aluminum, calcium, chromium, barium, magnesium and zinc, also oils, fats and waxes, such, for example, as lanolin, linseed oil, castor oil, mineral oil, paraffin, vegetable and animal waxes, and stearic acid, butyl stearate and the like.

*Preparation of the flow promoter*

The urea-formaldehyde-alcohol condensate may be prepared by any of the methods well known in the art. The condensates so produced are customarily termed by the trade as "urea-formaldehyde-ether resins" since the alcohol is believed to result in an ether linkage. For the alcohol there may be employed any of the monohydric or polyhydric alcohols as a class, such, for example, as methyl alcohol, ethyl alcohol, propyl alcohol, butyl alcohol, the amyl alcohols, cyclohexanol, benzyl alcohol, the monoethyl ether of ethylene glycol, e. g. "Cellosolve", the monoethyl ether of diethylene glycol, other monoalkyl and monoaryl ethers of ethylene glycol and diethylene glycol, 2-ethyl hexanol, n-octyl alcohol, lauryl alcohol, and the like.

In one embodiment, urea and formalin may be reacted in the presence of an alkali for example at pH of 8 to 9, by refluxing for a short time. The product is then poured into a vessel containing an excess of alcohol for example butanol, sufficient acid e. g., phthalic or maleic acid, being present to cause the aqueous resin to dissolve in the alcohol. Reaction is continued while simultaneously removing the water present but returning the alcohol to the reaction mass, whereupon the alcohol reacts with the urea-formaldehyde to form the urea-formaldehyde-alcohol condensate.

The preferred mole ratio of urea to formaldehyde used for preparing the alkylated condensate may lie between 1.5 to 3 moles of formaldehyde per mole of urea employed.

For the acid catalyst used during reaction there may be employed any acid so long as it provides the proper pH value, but it is preferred that the organic acids be used since with such acids it is easier to control the pH of the solution. For the neutralizing agent there may be used any of the inorganic alkalies or organic bases which were described in the preparation of the urea-formaldehyde condensate.

After the completion of the reaction the excess alcohol, if any is present, may be removed by evaporation or such excess may be used as the solvent for the condensate.

However, in the now preferred embodiment, some or all of the excess alcohol may be removed after the removal of water is completed. The urea-formaldehyde-alcohol condensate thus may be mixed directly with a dry urea-formaldehyde condensate. It is desirable to use the urea-formaldehyde-alcohol condensate with as little solvent present as possible, but in order to preserve its stability and to facilitate mixing and combining with the urea-formaldehyde condensate there may be used as a vehicle such solvents as xylene, toluene, benzene or petroleum hydrocarbons. The urea-formaldehyde-alcohol condensate thus produced is mixed with the urea-formaldehyde condensate separately prepared. The mixing of the urea-formaldehyde-alcohol condensate solution with the urea-formaldehyde condensate may take place before or after drying of the urea-formaldehyde condensate. When the solution is mixed with the condensate before drying the latter, the subsequent drying is then carried out under conditions of temperature, acidity and time so as not to substantially advance the reaction, thus avoiding pre-curing, for example, by drying the substantially neutral mixture at a temperature approximately from 50°–90° C. until the product is sufficiently dry to be pulverized. When the mixing of the urea-formaldehyde-alcohol condensate solution and the urea-formaldehyde condensate occurs after the drying of the latter, the drying of the condensate may be carried out under such conditions of time, temperature, and acidity so as to remove all the water possible thus resulting in a stiff product showing insufficient flow in the mold. Thereafter, the flow promoter solution is added to restore the desired flow characteristics. In any case, the mixture of the urea-aldehyde condensate and the organic solution is subjected to the drying operation to evaporate the organic solvent and preferably simultaneously drive off water from the product. In addition to the use of the non-aqueous flow promoter solution, there may be added to the composition an aqueous flow promoter solution of the type disclosed and claimed in my co-pending U. S. application Serial No. 664,207.

As pointed out in my parent co-pending U. S. application Serial No. 664,207, I have found that if I continue the drying of the urea-formaldehyde condensate until the water content is very low I can add the solution of the urea-formaldehyde-alcohol condensate in a non-aqueous organic solvent. The preparation of urea-formaldehyde-alcohol condensates in liquid condition, substantially free of water, is relatively expensive but as described in my parent case, no more than 20 per cent of the expensive water-free organic solution need be used. I find that the composition so prepared is more stable on standing than a composition made directly from urea and formaldehyde or plasticized by a liquid mixture of (a) urea and formaldehyde or (b) a liquid urea-formaldehyde reaction product. Such a composition has better molding characteristics, i. e., the flow of the material when the mold is closed is more even and requires less pressure. The final molded product is less brittle. The fact that there is less water present makes the molded product less likely to blister on account of less gas being present during the molding operation, also because very little water is present at a higher temperature and thus a shorter time in the mold is required.

There may be added to the fusible urea-formaldehyde condensate and/or to the flow promoter or to the combination, a suitable non-volatile organic plasticizer to further increase the resistance to brittleness, and to retard the absorption of water by the mixture. Suitable plasticizers are, for example, castor oil, dibutyl phthalate, dicresyl phthalate, chlorinated paraffin, and the like.

In my parent co-pending application I have described by way of example a method for carrying out the preparation of the organic solution of the urea-formaldehyde-alcohol condensate and for mixing it with the fusible urea-formaldehyde condensate. The following examples are given by way of illustration and not by way of limiting the invention. All parts given are by weight.

*Example I.*—5 pounds of paraform was stirred with 2 pounds of Cellosolve (monoethyl ether of ethylene glycol). The mixture was then acidified with acetic acid so that a test made with a portion dissolved in distilled water gave a pH of approximately 5. 6 pounds of urea were separately dissolved in 1 pound of Cellosolve and this second solution was then poured slowly into the paraformaldehyde-Cellosolve mixture while the latter was boiling. Boiling was continued until the solution became viscous as the result of the formulation of the urea-formaldehyde-alcohol condensate. The solution when cold was sticky and viscous, and was not entirely clear. When heated, it became mobile and less viscous and did not show any tendency to gelatinize. If the resulting solution was neutralized for example, by adding 2 pounds of triethanolamine, the final solution thus obtained was clear and transparent. 5 pounds of a plasticizer such as dibutyl phthalate was then dissolved in the solution, and the resulting solution was then added to 100 pounds of a thoroughly dried fusible urea-formaldehyde condensate.

The urea-formaldehyde condensate was prepared according to the process set forth in my U. S. application Serial No. 363,397, filed May 15, 1929, now abandoned. The urea-formaldehyde condensate was prepared by refluxing 225 grams of urea with 456 c. c. of a neutral solution of 40 per cent formaldehyde. The solution became milky immediately after boiling. Boiling was continued for one hour, after which the reaction product was mixed with 150 grams of powdered paper pulp, and the mixture then dried.

The pH of a distilled water extract of the resulting composition comprising the dried fusible urea-formaldehyde condensate mixed with the above urea-formaldehyde-alcohol condensate solution was 5.5. The former urea-formaldehyde composition was so stiff that it hardly flowed in the mold, but after such mixing it became very plastic.

*Example II.*—Instead of mixing the urea-formaldehyde-alcohol condensate of Example I with the urea-formaldehyde condensate prepared according to the process set forth in my U. S. application Serial No. 363,397, the urea-formaldehyde-alcohol condensate was mixed with a urea-formaldehyde condensate prepared according to the process set forth in my U. S. application Serial No. 664,208, wherein a urea-formaldehyde condensate was made by reacting a urea-formaldehyde mixture having a mol ratio of 1.5:2 respectively, with ammonia added to bring the hydrogen ion concentration of the solution to a pH of 6.5 and this solution held at 30° C. for about 30 minutes. The formaldehyde used (commercial Formalin) was in the form of a solution containing about 40 per cent formaldehyde by volume. It was then mixed with paper (alpha fibre in wet form) to give 40 per cent on the dry weight and subjected at once to a stream of dry air for some hours at a temperature below 100° C. and preferably between 50-90° C. to form a dry product.

Approximately 90 per cent of the above urea-formaldehyde condensate was then mixed with approximately 10 per cent of the above urea-formaldehyde-alcohol condensate, and the product further dried to remove excess volatile matter. The resulting mixture was found to have enhanced flow characteristics when used as a molding composition, as well as having better storage stability on standing and yielded a final molded product which was free from objectionable brittleness.

*Example III.*—An urea-formaldehyde-alcohol condensate was prepared in the manner set forth in Example I, but an equivalent amount of butyl alcohol was used instead of the Cellosolve, and the reaction continued in manner described. After the solution became viscous as a result of the formation of the urea-formaldehyde-butanol condensate, the resulting solution was neutralized by addition of sufficient triethanolamine. The final product thus obtained was a clear, transparent solution. To this there was added from 2 to 5 pounds of a plasticizer comprising chlorinated paraffin.

The urea-formaldehyde-butanol condensate above described was then dissolved in xylol to produce a composition comprising approximately 25 per cent xylol and 75 per cent urea-formaldehyde-butanol condensate. The mixture comprised approximately 50 per cent urea-formaldehyde-butanol resin on a dry weight basis.

To a urea-formaldehyde fusible condensate prepared in a manner described in Example II, but prior to drying, there was added approximately 3 per cent of the above urea-formaldehyde-butanol condensate containing the xylol solvent and plasticizer. The materials were then thoroughly mixed, preferably in a shredder in order to obtain a homogeneous emulsion or mixture. During the mixing there was added filler in the form of wood pulp and the mixing and shredding continued at an elevated temperature of slightly above 50° C. in order to drive off the water, xylol and excess butanol. The resulting product was quite uniform and when it was subjected to a molding operation, it was found that an especially good flow in the mold was obtained at temperatures and pressures lower than those ordinarily required in employing the fusible urea-formaldehyde condensate alone. The product also had greater package stability in storage over a longer period of time in comparison to other products not having the flow stabilizer present, which also enhances the plasticity. The final molded product was found to have greater resistance to moisture and brittleness.

From the foregoing disclosure and examples, it will be obvious that the urea-formaldehyde-alcohol condensate has the function not only of acting as a flow promoter when mixed with a urea-formaldehyde composition, such as promoting flow in the mold when used as a molding powder, but also serves to stabilize urea-formaldehyde compositions so that they do not prematurely decompose during storage. The urea-formaldehyde-alcohol condensate also serves as a plasticizer to reduce brittleness of the final product. Thus, the urea-formaldehyde-alcohol condensate may be said to have a tri-functional purpose when combined with the ordinary urea-formaldehyde condensate, namely a stabilizer, a flow promotor and a plasticizer for the final product.

The urea-formaldehyde condensate combined with the flow promoter comprising the urea-formaldehyde-alcohol condensate may have a variety of uses, as, for example, in the formation of products which may be formed by casting, molding, laminating, or it may be used as an adhesive material. When used in laminating or in the form of adhesives, it is often convenient to omit the filler from the composition. The filler may be used, however, to provide reinforcement for self-sustaining structures, such as castings or moldings.

The invention contemplates that in one embodiment the volatile organic liquid used as the vehicle in the flow promoter may be allowed to remain in whole or in part in the final product, particularly when the product is used for coating, laminating, or as an adhesive. On the other hand, when the product is to be used as a molding powder, the volatile organic liquid is preferably removed so that the powder is free-flowing and not surface wet, or all of the volatile organic liquid may be evaporated to give a perfectly dry product suitable for compression molding, and the like.

Since certain changes in carrying out the above process and several modifications in the product which embody the invention may be made without departing from its scope, it is intended that all matter contained in the above description shall be interpreted as illustrative and not in a limiting sense.

I claim:

1. A dry free-flowing molding powder comprising a granulated mixture of a fusible resin consisting of a reaction product of urea and formaldehyde as the sole reactants, a cellulose filler, and a minor proportion by weight of a flow promoter comprising a fusible urea-formaldehyde-alcohol condensate, said alcohol condensate imparting to the powder an increased stability during storage and increasing the flow when the powder is subjected to molding by heat and pressure.

2. A dry free-flowing molding powder comprising a granulated mixture of a fusible resin consisting of a reaction product of urea and formaldehyde as the sole reactants, a cellulose filler, and not over 20% by weight of a flow promoter comprising a fusible urea-formaldehyde-alcohol condensate, said alcohol condensate imparting to the powder an increased stability during storage and increasing the flow when the powder is subjected to molding by heat and pressure.

3. The composition of claim 1 in which the flow promoter comprises a non-volatile organic plasticizer in addition to the alcohol condensate.

4. The composition of claim 2 in which the flow promoter comprises a non-volatile, organic plasticizer in addition to the alcohol condensate.

LEONARD SMIDTH.

REFERENCES CITED

The following references are of record in the file of this patent:

UNITED STATES PATENTS

| Number | Name | Date |
|---|---|---|
| 1,998,539 | Gams et al. | Aug. 23, 1935 |
| 2,020,024 | Francisco | Nov. 5, 1935 |
| 2,056,456 | Howald | Oct. 6, 1936 |
| 2,273,788 | Olin | Feb. 17, 1942 |
| 2,329,172 | Smidth | Sept. 7, 1943 |

FOREIGN PATENTS

| Number | Country | Date |
|---|---|---|
| 737,818 | France | Oct. 10, 1932 |